United States Patent [19]

Tash

[11] Patent Number: 4,591,194

[45] Date of Patent: May 27, 1986

[54] FLUID CONDUIT ASSEMBLY

[76] Inventor: George Tash, 18658 Chase St., Northridge, Calif. 91324

[21] Appl. No.: 514,289

[22] Filed: Jul. 15, 1983

[51] Int. Cl.⁴ .............................................. F16L 33/20

[52] U.S. Cl. .................................... 285/249; 285/256; 285/259

[58] Field of Search ................ 285/256, 259, 249, 174

[56] References Cited

U.S. PATENT DOCUMENTS

| | | | |
|---|---|---|---|
| 920,963 | 5/1909 | Keyes | 285/249 |
| 1,509,484 | 9/1924 | Powell | 285/249 X |
| 1,962,060 | 6/1934 | Emery, Jr. | 285/174 |
| 2,481,730 | 9/1949 | Doerr | 285/174 |
| 3,017,203 | 1/1962 | Macleod | 285/256 |
| 3,168,333 | 2/1965 | Dziura | 285/256 X |
| 3,441,296 | 4/1969 | Wilkin | 285/174 |
| 4,018,460 | 4/1977 | Morris et al. | 285/174 X |
| 4,030,778 | 6/1977 | Kaut, Jr. | 285/174 |
| 4,208,067 | 6/1980 | Ragout et al. | 285/259 X |

FOREIGN PATENT DOCUMENTS

| | | | |
|---|---|---|---|
| 1034622 | 6/1966 | United Kingdom | 285/256 |

*Primary Examiner*—Thomas F. Callaghan

*Attorney, Agent, or Firm*—John J. Posta, Jr.

[57] ABSTRACT

The improved fluid conduit assembly of the present invention comprises a conduit plug having an expanded diameter portion and/or narrow portion of reduced diameter, with a fluid passageway extending the length of the plug. The assembly also includes a flexible, resilient, fluid conduit, such as a water hose or drain unclogger having an open end within which the plug is disposed, and a conduit connector connected to the open conduit end by a tubular sleeve disposed over the open conduit end and compressing the conduit end in against the reduced diameter portion of the plug in liquid sealing engagement therewith. In connecting the connector to the conduit, the sleeve is first slid into place and then reduced in diameter, as by crimping, to hold it firmly to the conduit. The resilient nature of the conduit allows it to assume the contour of the outer surface of the plug during the sleeve reducing step. The conduit end which contains the plug may have an initially reduced diameter portion and an expanded diameter portion aligned with those of the plug. The connector may include a threaded portion for connection to a water hose. The assembly is inexpensive and convenient, and permits connectors to be quickly fitted in place over conduits without blocking the flow of fluid through the conduit.

4 Claims, 5 Drawing Figures

FLUID CONDUIT ASSEMBLY

BACKGROUND OF THE INVENTION

1. Field of the Invention

The present invention generally relates to conduits and more particularly to a fluid conduit having an improved type of sealed connection to a connector.

2. Prior Art

A conduit connector is usually applied to a water hose or the like by crimping a sleeve directly over and into the hose body. This may damage the hose body and eventually the connection may loosen and allow water leakage from the assembly. Certain other connectors are connected to water conduits in other manners, such as by brazing, clamping, swaging etc., depending upon the particular nature of the conduit and the connector. Most of such connectors and methods of connection are relatively expansive and/or relatively inefficient, frequently permitting leakage of water and other liquids through the connection after a period of use.

Accordingly, there is a need for an improved, inexpensive, simple, easy to install system for connecting a connector to a fluid conduit which will result in a liquid tight seal and will not damage the conduit.

SUMMARY OF THE INVENTION

The improved fluid conduit assembly of the present invention satisfies all the foregoing needs. The assembly is substantially as set forth in the Abstract above. It comprises, in combination, a flexible resilient conduit, a conduit plug having a fluid passageway therethrough, the plug being disposed in the end of the conduit, and a connector. The connector is secured to the conduit by a tubular sleeve disposed after the conduit and crimped down or otherwise radially reduced to compress the conduit against the plug, preferably against a central plug portion thereof which is of reduced diameter. The conduit may have a similar area of reduced diameter aligned with that of the plug. Relatively little force need be used to cause the conduit to tightly grip the outer surface of the plug to seal it against leakage. No damage to the conduit occurs. The seal is durable, and simple, easy and inexpensive to install.

The conduit can be of any suitable elastomeric material, such as natural or synthetic rubber, or rubber-like plastic, selected plastisol or the like. It can include a terminal peripheral, centrally directed rim which helps retain the plug in place prior to crimping of the connector sleeve thereto.

The plug can be of any relatively firm material such as hard rubber, plastic, ceramic, preferably non-corrosive metal or the like. The plug is generally tubular and is of an approximate hourglass shape, but also can be bell-shaped or otherwise shaped to provide contiguous portions of different diameters.

The connector can be of plastic, metal or the like, includes the previously described tubular sleeve extending from one end thereof and a connector component such as an internally threaded, rotatable second sleeve extending from the opposite end thereof. The second sleeve can be used to connect the connector and attached conduit to a water hose, fire hydrant, pipe or other source of water or other fluid.

Further features of the invention are set forth in the following detailed description and accompanying drawings.

DETAILED DESCRIPTION OF THE PREFERRED EMBODIMENTS

Figure 1:
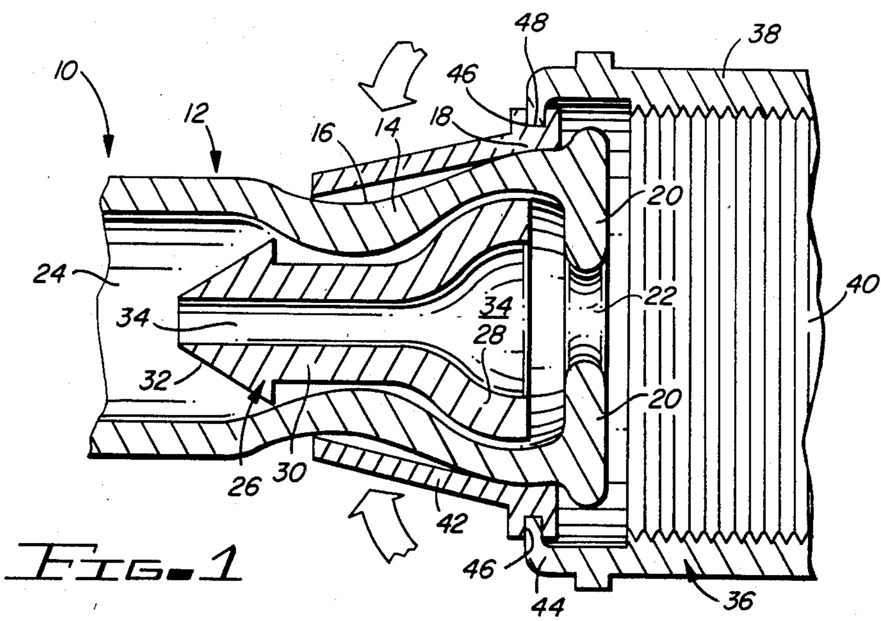
FIG. 1 is a schematic longitudinal cross-section of a first preferred embodiment of the improved fluid conduit assembly of the present invention, showing the connector sleeve thereof before crimping over the conduit end thereof.
Figure 2:
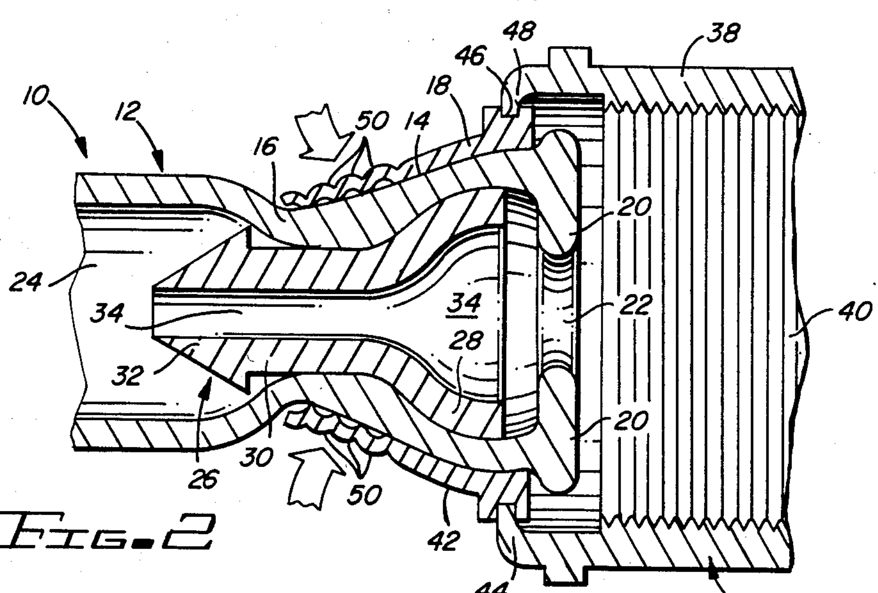
FIG. 2 is a schematic longitudinal cross-section of the assembly of FIG. 1, shown after the connector sleeve thereof has been crimped over the conduit end thereof.

FIGS. 1 and 2

Now referring more particularly to FIGS. 1 and 2 of the accompanying drawings, a first preferred embodiment of the improved fluid conduit assembly of the present invention is schematically depicted therein. Thus, assembly 10 is shown which comprises a flexible, resilient generally cylindrical, hollow conduit 12, having an end 14 which has a neck-down portion 16, an expanded portion 18 and a terminal rim 20, which is directed towards the longitudinal center line of conduit 12, but defines a central opening 22 communicating with the passageway 24 in conduit 12.

Conduit 12 can be fabricated of any suitable elastomeric material such as natural or synthetic rubber, rubber-like plastic, etc., and may be a drain pipe, hose or any other suitable water or other conduit. For example, conduit 12 may be, if described, the end portion of a drain pipe flush tube, such as is described and claimed in my copending U.S. patent application, Ser. No. 514,290 filed July 15, 1983 and entitled PIPE FLUSHING DEVICE now U.S. Pat. No. 4,475,255.

It will be understood that end 14 need not have necked-down portion 16 and expanded portion 18, although they are desirable to facilitate interconnection of components of assembly 10 together. Moreover, rim 20 is also unnecessary, but acts as a desirable end reinforcement.

Assembly 10 also includes an elongated conduit plug 26 having an expanded waist portion 28 and a neck portion of reduced diameter 30. In this instance, plug 26 also includes an expanded frustoconical head 32. Plug 26 preferably is relatively hard, such as hard plastic, or rubber, non-corrodable metal, ceramic, glass or the like. Plug 26 is generally of an hourglass shape and has a central longitudinal passageway 34 extending therethrough. Conduit 12 is sufficiently flexible such that plug 26 can be disposed in passageway 24 of conduit 12, with head 32 just upstream, of portion 16, although head 32 is nominally larger in diameter than portion 16, conduit 12 stretching to make this accommodation, and with neck 30 in line with portion 16 and waist 28 aligned with expanded portion 18. Waist 18 terminates upstream of rim 20, which helps align plug 26 and hold it in place prior to final assembly.

Assembly 10 also includes a preferably cylindrical connector 36 having an internally threaded portion 38 defining a central passageway 40, and a tubular sleeve 42 keyed to the front end 44 of portion 38, as by a periperal groove 46 in sleeve 42 receiving an inwardly directed rim 48 of portion 38, so that portion 38 can freely rotate relative to sleeve 42. Thus, portion 38 can be rotated to threadably releasably connect assembly 10 to the end of a hose, pipe or other conduit (not shown) for introduction of fluid, preferably water, through passageway 40, into passageway 34 and then its passageway 24 of conduit 12.

Threaded portion 38 is preferably of relatively noncorrosive metal, such as brass, aluminum, stainless steel, or hard plastic or rubber, etc., while sleeve 42 is of relatively thin, malleable metal such as brass, copper, aluminum, etc. or very thin iron or steel. In FIG. 1, sleeve 42 is shown unconnected to but receiving end 14 therewithin. FIG. 2 shows assembly 10 after sleeve 42 has been crimped tightly around conduit 12 to complete assembly 10, specifically with sleeve 42 crimped around portion 16, causing it to tightly conform to the contour of the outer surface of neck 30 and causing expanded portion 18 to tightly grip waist 28. If desired, sleeve 42 may include a longitudinal opening (not shown) or may be split ring in nature to facilitate the crimping step.

Moreover, during such crimping, portion 16 locks against head 32 to prevent it from being withdrawn from end 14, so that plug 26 is firmly locked into end 14 in fluid sealing engagement therewith. Any conventional crimping tool can be used to accomplish the crimping. The crimping leaves crimps 50 in sleeve 42, which lock sleeve 42 to end 14 (FIG. 2). Thus, assembly 10 can easily be completed, with the components thereof firmly locked together in full fluid sealing engagement, and without damage to conduit 12 or impairment of free flow of fluid through passageways 40 and 34 and through interconnecting passageway 34 of plug 26. Assembly 10 is inexpensive, efficient and durable.

Figure 3:
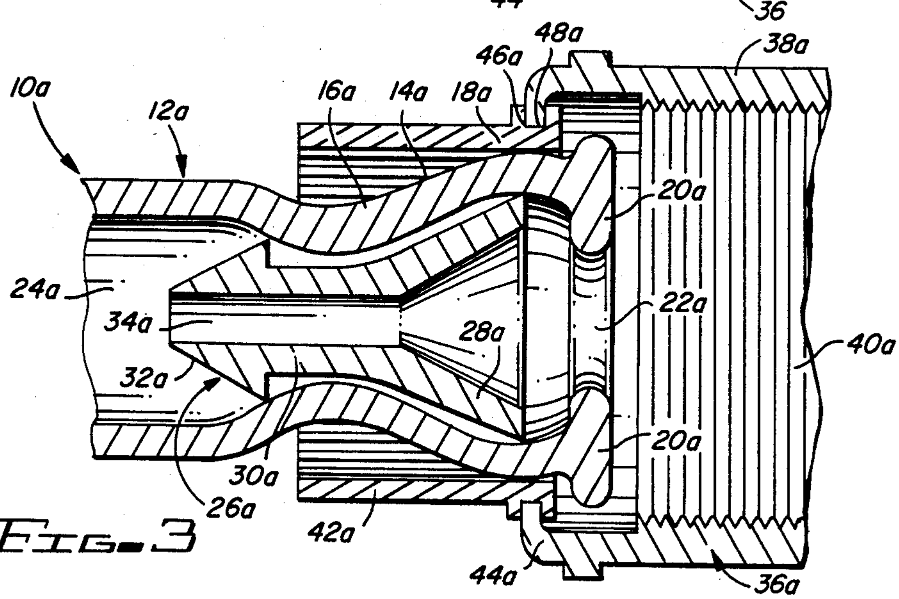
FIG. 3 is a schematic longitudinal cross-section of a second preferred embodiment of the improved fluid conduit assembly of the present invention, showing the connector sleeve thereof before crimping over the conduit end thereof.
Figure 4:
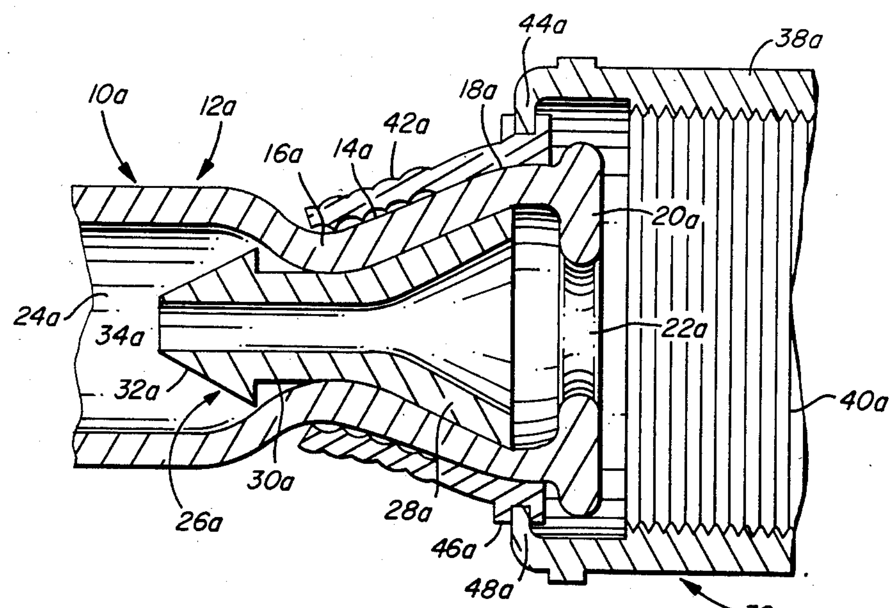
FIG. 4 is a schematic longitudinal cross-section of the assembly of FIG. 3, shown after the connector sleeve thereof has been crimped over the conduit end thereof.

FIGS. 3 and 4

A second preferred embodiment of the improved fluid conduit assembly of the present invention is schematically depicted in FIGS. 3 and 4. Thus, assembly **10*a* is shown. Components thereof similar to those of assembly 10 bear the same numerals but are succeeded by the letter "a". Thus, assembly 10*a* includes conduit 21*a* having end 14*a* with portions 16*a* and 18*a*and rim 20*a* with opening 22*a* leading to passageway 24*a*. Plug 26*a* is disposed in passageway 24*a*and includes waist 28*a*, neck 30*a*, head 32*a* and passageway 34*a***.

Connector **36*a* is connected (FIG. 4) to conduit 12*a* through crimping of sleeve 42*a* therearoud, as previously described for sleeve 42 relative to conduit 12. Connector 36*a* includes portion 38 (with passageway 40*a*), rotatably secured to sleeve 42*a* at end 44*a* by groove 46*a* and rim 48*a*. As can be seen in FIG. 3, sleeve 42*a* is fluted, facilitating its folding and crimping around portion 16*a*, as shown in FIG. 4. The properties and advantages of assembly 10*a* are similar to those of assembly 10**.

FIG. 5

Figure 5:
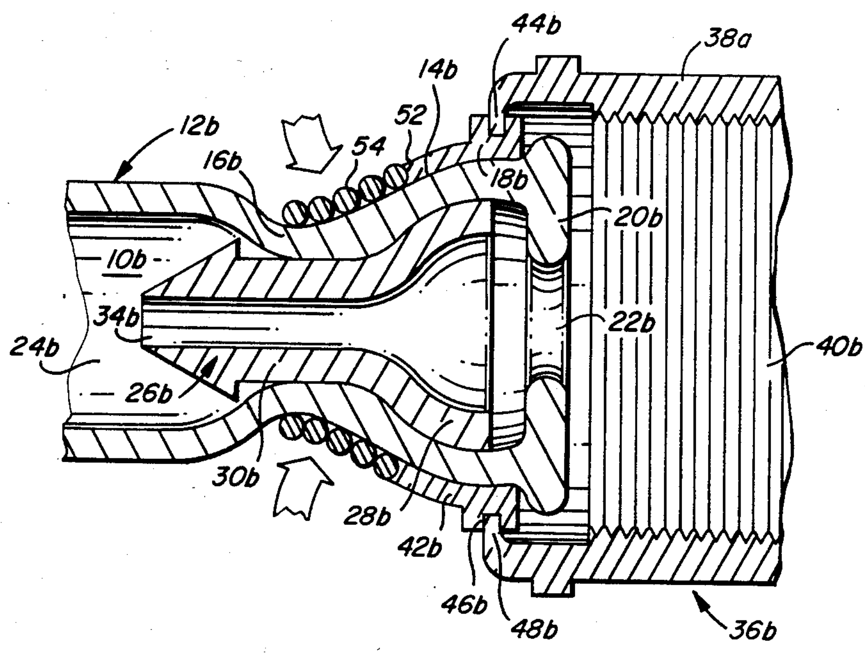
FIG. 5 is a schematic longitudinal cross-section of a third preferred embodiment of the improved fluid conduit assembly of the present invention, shown with the connector sleeve thereof secured tightly over the conduit end thereof.

A third preferred embodiment of the improved fluid conduit assembly of the present invention is schematically depicted in FIG. 5. Thus, assembly **10*b* is shown. Components thereof similar to those of assembly 10 bear the same numerals but are succeeded by the letter "b". Thus, assembly 10*b* includes conduit 12*b* having end 14*b* with portions 16*b* and 18*b*, rim 20*b*, opening 22*b* and passageway 24*b***.

Plug **26*b* is disposed in passageway 24*b* and includes waist 28*b*, neck 30*b* and passageway 34*b***.

Connector **36*b* includes portion 38*b*, with passageway 40*b* and sleeve 42*b* keyed thereto through groove 46*b* in rim 48*b* in end 44*b* of portion 38*b*. The front end 52 of sleeve 42*b* comprises a helically wound malleable wire 54 integrally connected to the remainder of sleeve 42*b*. Wire 54 is pulled very tight around portion 16*b* and the mashed against portion 16*b* to in turn mash it against neck 30*b* and lock plug 26*b* in fluid sealing engagement within conduit 12*b*. Accordingly, assembly 10*b* is generally similar to assembly 10, assembly 10*a*** and had substantially similar advantages.

Thus, the assembly of the present invention has improved reliability in use, fluid seal thereof being very durable. Moreover, the assembly comprises simple, inexpensive components, rapidly and easily assembled together. Other advantages are as set forth in the foregoing.

Various other modifications, changes, alterations and additions can be made in the improved fluid conduit assembly of the present invention, its components and their parameters. All such changes, modifications, alterations and additions as are within the scope of the appended claims form part of the present invention.

What is claimed is:

1. An improved fluid conduit assembly, said assembly comprising, in combination:

(a) a flexible, resilient and readily deformable fluid conduit, having an open end, (b) a substantially rigid conduit plug having a longitudinally extending fluid passageway therein, said plug having radially extending end portions at the front and rear ends thereof which define an annular channel therebetween, (c) a conduit connector assembly, including:

(i) a connector member and (ii) a readily deformable tubular sleeve attached to said connector member, (d) wherein said plug is disposed inside said fluid conduit near its open end, and said fluid conduit with said plug therein is disposed within said tubular sleeve, whereby said sleeve is deformed and compressed into said annular channel of said plug to thereby hold and retain said conduit between said plug and said sleeve, wherein said fluid can pass freely through said conduit and plug, (e) wherein said open end of said conduit bears a centrally directed flexible terminal rim which retains said plug in place in the absence of securement by said sleeve, (f) wherein said conduit end in which said plug is disposed has a necked-down portion and an expanded portion, said necked-down portion being aligned with said annular channel.

2. The improved conduit assembly of claim 1 wherein said sleeve is crimped down tightly over said conduit end, pressing it in liquid sealing engagement with said plug.

3. The improved conduit assembly of claim 2 wherein said conduit is elastomeric and is selected from the group consisting of natural and synthetic rubber, and plastic, and wherein said plug is plastic.

4. The improved conduit assembly of claim 3 wherein said conduit is a water hose and wherein said connector member is a fitting allowing releasable connection to another water hose or the like.

* * * * *